No. 734,284. PATENTED JULY 21, 1903.
F. STEBLER.
FRUIT OR VEGETABLE BRUSHER.
APPLICATION FILED APR. 29, 1902.
NO MODEL. 2 SHEETS—SHEET 1.
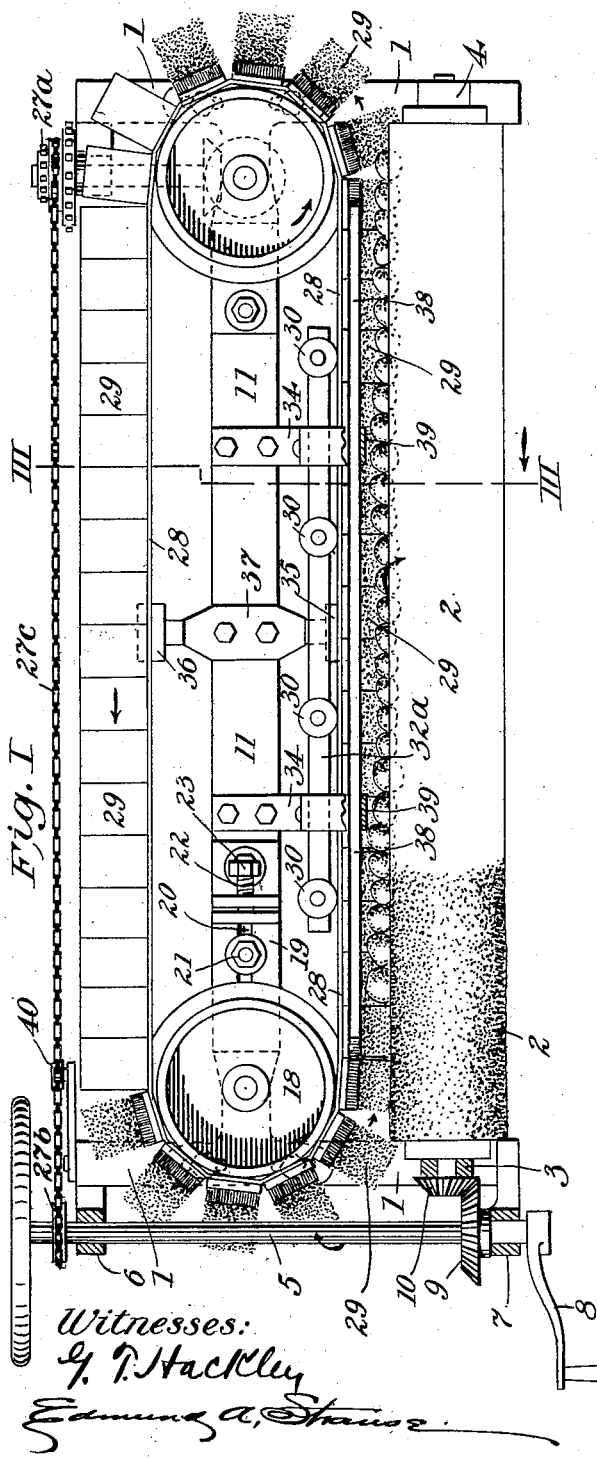
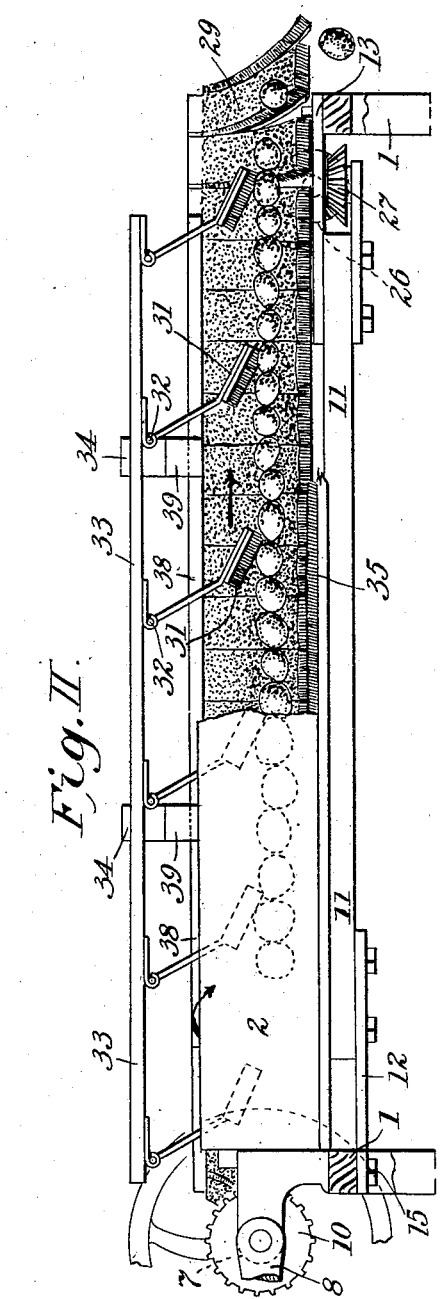
Witnesses:
G. T. Hackley
Edmund A. Strauss
Inventor:
Fred Stebler
by Townsend Bros
his Attys.

No. 734,284. PATENTED JULY 21, 1903.
F. STEBLER.
FRUIT OR VEGETABLE BRUSHER.
APPLICATION FILED APR. 29, 1902.
NO MODEL.
2 SHEETS—SHEET 2.
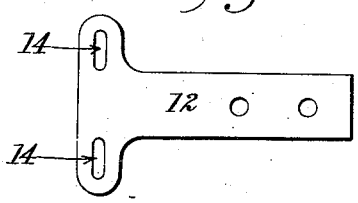
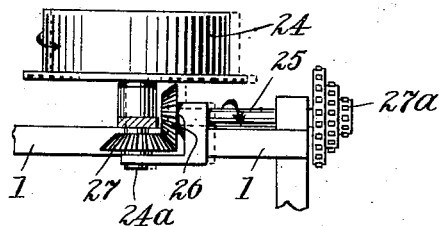
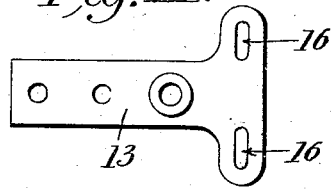
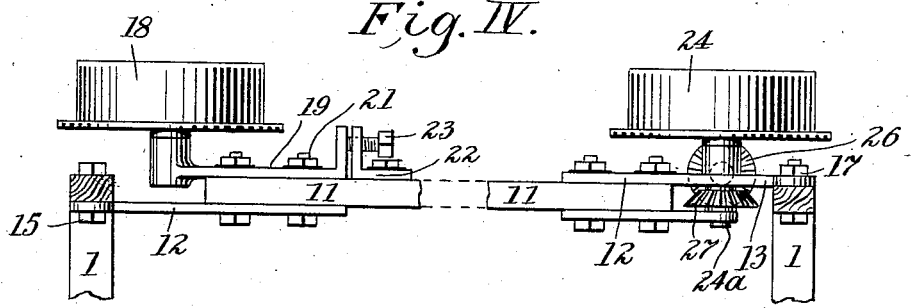
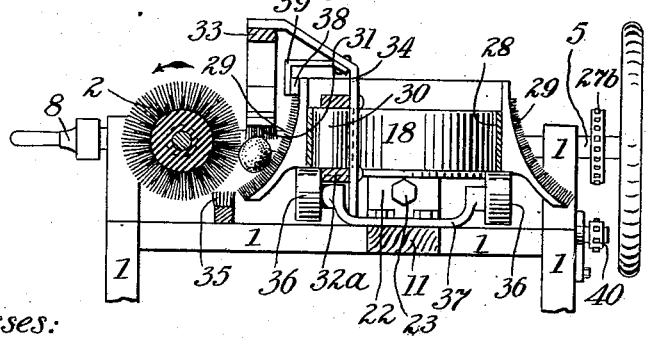
Witnesses:
G. P. Hackley
Edmund A. Strauss
Inventor:
Fred Stebler
by Townsend Bros
his Attys.

No. 734,284. Patented July 21, 1903.

UNITED STATES PATENT OFFICE.

FRED STEBLER, OF RIVERSIDE, CALIFORNIA.

FRUIT OR VEGETABLE BRUSHER.

SPECIFICATION forming part of Letters Patent No. 734,284, dated July 21, 1903.

Application filed April 29, 1902. Serial No. 105,208. (No model.)

*To all whom it may concern:*

Be it known that I, FRED STEBLER, a citizen of the United States, residing at Riverside, in the county of Riverside and State of California, have invented new and useful Improvements in Fruit or Vegetable Brushers, of which the following is a specification.

My invention relates to a machine for brushing and cleaning fruit or vegetables, and has for its object to provide a machine which may be adapted to operate upon various sizes of the same, also to provide a machine which after being adjusted to a certain size of fruit will brush and clean fruit which may vary somewhat from the regular graded size being operated upon.

Another object is to provide means for varying the speed at which the fruit is carried through the machine, and thereby accordingly regulating the amount of brushing given to the fruit.

Other objects, such as simplicity of construction and effectiveness and ease of operation, are attained by the construction hereinafter described.

Figure I is a plan view. Fig. II is a side elevation, a portion being broken away. Fig. III is a section on line III III of Fig. I. Fig. IV is a view showing certain details in the construction of the carrying and adjusting mechanism. Fig. V is a detail of a portion of the belt-driving mechanism. Figs. VI and VII are details of parts of clamping devices.

1 is a frame.

2 is a cylindrical brush rotatably mounted in stationary bearings 3 and 4.

5 is a shaft mounted in stationary bearings 6 and 7.

8 is a crank for rotating the shaft 5.

The brush 2 is driven from the shaft 5 through the medium of bevel-gears 9 and 10.

11 is a support which is adjustably connected to the frame 1 by extensions 12 and 13. The extension 12 is provided with elongated slots 14, through which bolts 15 pass to adjustably secure the extension 13 to the frame 1. The extension 13 is provided with elongated slots 16, through which bolts 17 pass to secure the extension 13 to the frame 1.

18 is a pulley revolubly mounted on a plate 19. The plate 19 has a slot 20, (see Fig. I,) and a fastening-bolt 21 passes therethrough to hold the plate 19 in position on the support 11.

22 is an angle-plate rigidly attached to the support 11. Passing through the vertical extension of the angle-plate is an adjusting-screw 23, by means of which the plate 19 may be moved longitudinally of the support 11.

24 is a pulley mounted on a shaft $24^a$, which is journaled in the extension 13.

25 is a shaft revolubly mounted in the frame 1 and slidable therein and carrying a bevel-gear 26, which meshes with a bevel-gear 27, carried by the shaft $24^a$.

$27^a$ is a cone-sprocket carried by the shaft 25.

$27^b$ is a sprocket carried by the shaft 5.

A chain $27^c$ connects the sprockets $27^a$ and $27^b$.

28 is an endless belt carried by the pulleys 18 and 24. Attached to the belt 28 are a series of brushes 29. The surface of each brush is curved and the bristles gradually increase in length toward the lower end of the brush. Referring to Fig. III, it will be seen that a substantially V-shaped trough-like space is formed between the brush 2 and the brushes 29. This space is relatively wide at the upper portion and gradually narrows toward the bottom, so that different sizes of fruit may lie between the brushes 29 and the brush 2. This V-shaped opening or trough-like space has an open bottom, the brush 35 merely filling part of the opening, and the dirt and other refuse which is brushed from the fruit is given a chance to fall from the machine as the cylindrical brush 2 is rotated and keeps the fruit stirred up and constantly agitated, thereby giving no chance for the dirt, grit, and other refuse to pack in and wedge in the bottom of the trough, and thus prevent the effectual cleaning of the fruit.

30 represents antifrictional rolls mounted between the supports $32^a$. The rolls 30 are held in position to bear against the inside of the belt 28 and hold the belt from springing away from its position relative to the brush 2.

31 represents brushes hinged, as shown at 32, to a support 33. The support 33 is rigidly secured to the support 11 by arms 34. The brushes 31 may be suspended in such a manner that they are free to swing vertically and may bear by gravity against the fruit.

35 is a stationary brush rigidly attached to the frame 1 and lies parallel with the brush 2 and adjacent the lower opening between the brush 2 and the brushes 29.

36 represents rolls revolubly mounted on a support 37, which is carried by the support 11. The rolls 36 lie against and support the opposite lower edges of the belt 28 and serve to prevent the belt from sagging.

38 is a guide attached to a bracket 39 and against which the upper end of the brushes 29 bear and slide. The bracket 39 is attached to and carried by the arm 34. The guide 38 serves to guide and further hold the brushes 29 from lateral play.

40 is an idle sprocket for taking up the slack of the chain 27$^c$.

The operation of the machine is as follows: Fruit may be conducted into the trough-like space formed between the curved brushes 29 and the brush 2 from any suitable feeding-hopper. (Not shown.) When the shaft 5 is rotated in the direction of the arrow, the brush 2 is revolved and also the pulley 24, which causes the belt 28 to be driven as indicated by the arrow and carry the brushes 29 along the side of the brush 2. As the brush 2 rotates it brushes the fruit and tends to impart a rotative effect to each piece of fruit, thus bringing every part of the surface of the fruit into contact therewith. The brushes 29 frictionally bear against the fruit and serve to hold the fruit against the brush 2. The combined action of the brushes causes the fruit to revolve in various directions and also moves it along, and thus causes a thorough brushing and cleaning of every portion of the surface of the fruit, so that by the time the fruit has traveled the entire length of the brush 2 it is completely cleaned. As the fruit moves along, the brushes 31 also bear by gravity against the fruit and serve to further brush and clean. The stationary brush 35 serves to prevent under-sized fruit from dropping away from the machine and also serves to brush any fruit that is small enough to come in contact with it.

When it is desired to clean fruit of substantially larger diameter, by loosening the bolts 15 and 17 the support 11 may be moved back from the brush 2, thereby making a larger space between the brushes 29 and the brush 2. Again, if smaller fruit is to be treated the support 11 may be adjusted closer to the brush 2.

It is evident that when the support 11 is moved the pulleys 18 and 24, belt 28, traveling brushes 29, and swinging brushes 31 are moved, likewise the several antifrictional rolls, and also the guide 38. The gears 26 and 27 and sprocket 27$^a$ are also moved; but the flexibility of the chain 27$^c$ allows the variation in the relative positions of sprockets 27$^a$ and 27$^b$.

The speed at which the fruit is carried along may be regulated by placing the chain 27$^c$ upon the proper step of the cone-sprocket 27$^a$.

When it is desired to take up the slack of the belt 28, the bolt 21 may be loosened and the screw 23 turned the desired degree, after which the plate 19 may again be clamped to the support 11 by tightening the bolt 21.

It is obvious that many changes may be made in the particular construction herein shown and described without departing from the spirit of the invention.

What I claim, and desire to secure by Letters Patent of the United States, is—

1. A cylindrical rotatable brush, means for forming a trough-like space longitudinally along one side only of said brush and for conveying fruit along said brush in said space of which said brush forms one side and said means forms the other side, mechanism for propelling said means along said brush and for rotating said brush in a direction transversely of the line of travel of said means.

2. A cylindrical rotatable brush, traveling brushes at one side only of said cylindrical brush and forming a trough-like space next to the cylindrical brush, said traveling brushes forming one side of the trough-like space and the cylindrical brush forming the other wall, means for propelling said traveling brushes along said cylindrical brush and for rotating said cylindrical brush in a direction transversely of the travel of the traveling brushes.

3. A cylindrical rotatable brush, a series of concave traveling brushes adjacent said rotatable brush and forming a trough-like space next to said rotatable brush.

4. A cylindrical rotatable brush, a series of concave traveling brushes adjacent said cylindrical brush forming an open-bottom trough-like space next to said brush and for moving fruit along said rotatable brush in said space.

5. A cylindrical rotatable brush, a series of concave traveling brushes adjacent said rotatable brush forming an open-bottom trough-like space next to said rotatable brush, the length of the bristles of said brushes increasing toward the lower ends of the brushes.

6. A cylindrical rotatable brush, a traveling brush adjacent said rotatable brush forming a trough-like space with a contracted lower portion next to said rotatable brush, and means for regulating the size of said trough-like space.

7. A cylindrical rotatable brush, a series of concave traveling brushes adjacent said rotatable brush and forming a trough-like space with a contracted lower portion next to said rotatable brush, and means for regulating the size of said trough-like space.

8. A cylindrical brush, a traveling brush adjacent thereto and having a curved face, the lower portion of the face being nearer the cylindrical brush than the upper portion of the face, and means to rotate said cylindrical brush and move said traveling brush along said cylindrical brush.

9. A cylindrical brush, a traveling brush adjacent thereto and having a curved face, the lower portion of the face being nearer the cylindrical brush than the upper portion of the face, a stationary brush lying adjacent the opening between the lower portion of said cylindrical brush and the lower end of said traveling brush, and means to rotate said cylindrical brush and move said traveling brush along said cylindrical brush.

10. A cylindrical brush, a traveling brush adjacent thereto and having a curved face the lower portion of the face being nearer the cylindrical brush than the upper portion of the face, a vertically-movable brush suspended between said cylindrical brush and said traveling brush, and means to rotate said cylindrical brush and move said traveling brush along said cylindrical brush.

11. A cylindrical brush, a traveling brush adjacent thereto and having a curved face, the lower portion of the face being nearer the cylindrical brush than the upper portion of the face, a vertically-movable brush suspended between said cylindrical brush and said traveling brush, a stationary brush lying adjacent the opening between the lower portion of said cylindrical brush and the lower end of said traveling brush, and means to rotate said cylindrical brush and move said traveling brush along said cylindrical brush.

12. A cylindrical brush, means to rotate said brush, a series of traveling brushes, means to move said traveling brushes longitudinally along said cylindrical brush, the space between said traveling brushes and said cylindrical brush being relatively narrow at the bottom and wide at the top thereby allowing fruit of various sizes to lie between said traveling brushes and said cylindrical brush and be engaged by both brushes.

In witness whereof I have signed my name to this specification in the presence of the subscribing witnesses, at Riverside, in the county of Riverside and State of California, this 23d day of April, 1902.

FRED STEBLER.

Witnesses:
 W. G. IRVING,
 G. C. DENNIS,
 M. H. ATKINS.